No. 683,983. Patented Oct. 8, 1901.
H. M. REEVES.
FURNACE FOR HEATING METAL.
(Application filed Oct. 29, 1900.)
(No Model.) 3 Sheets—Sheet 1.
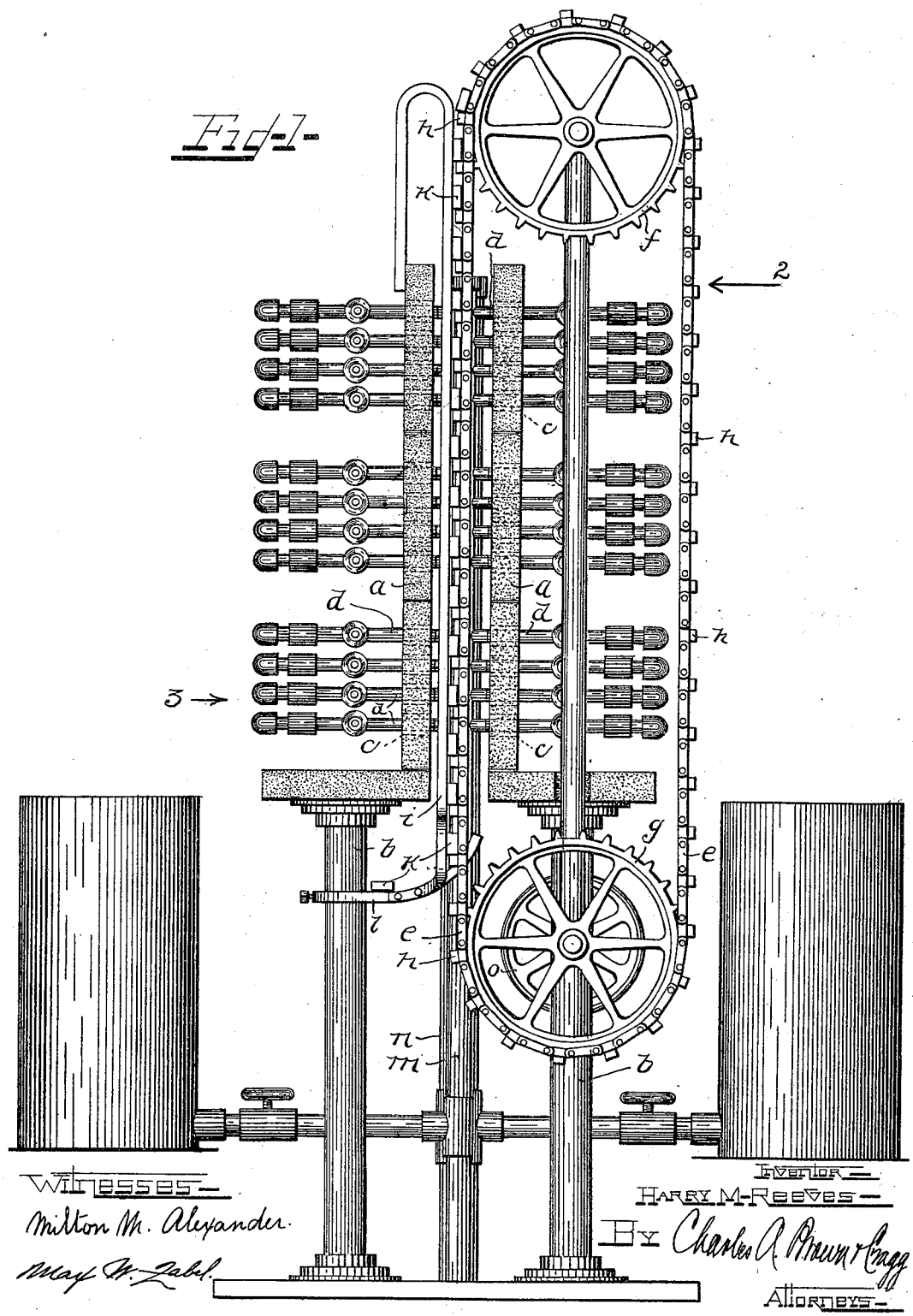
Witnesses
Milton M. Alexander
Max W. Zabel
Inventor
Harry M. Reeves
By Charles A. Brown & Cragg
Attorneys

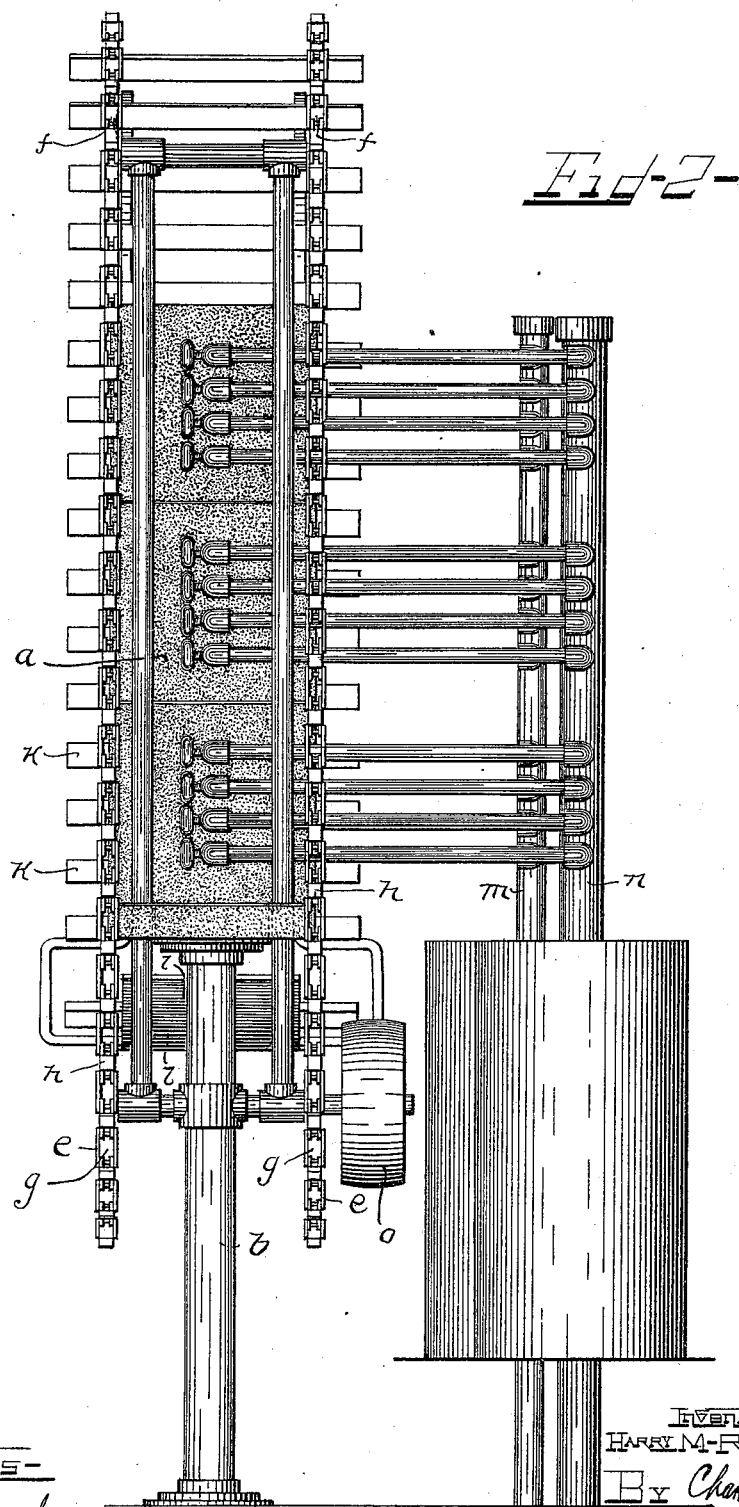

No. 683,983. Patented Oct. 8, 1901.
H. M. REEVES.
FURNACE FOR HEATING METAL.
(Application filed Oct. 29, 1900.)
(No Model.) 3 Sheets—Sheet 3.
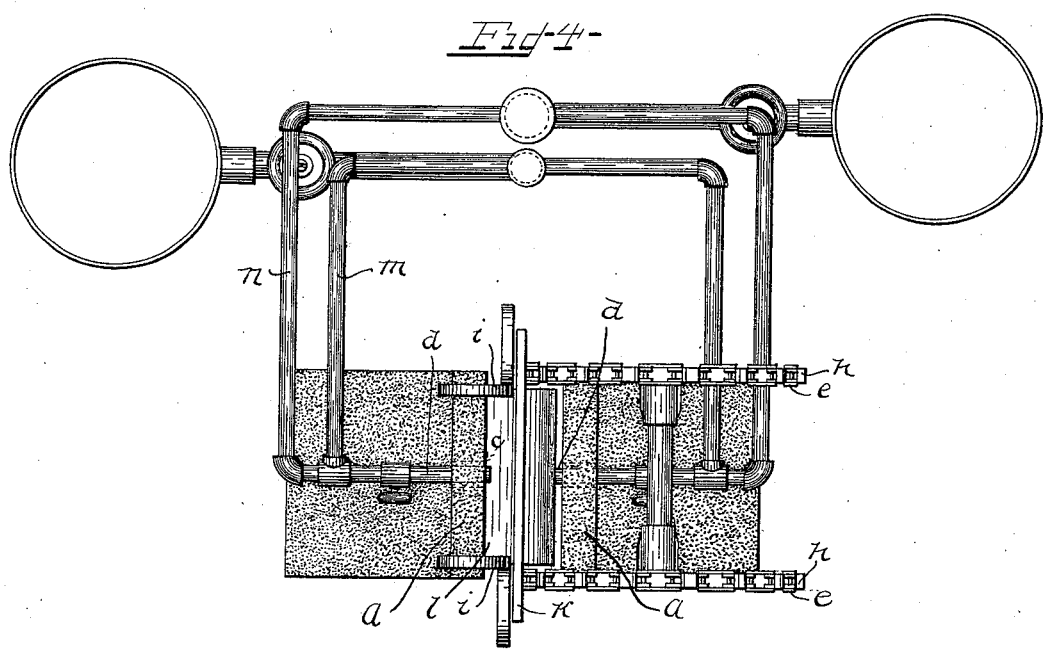
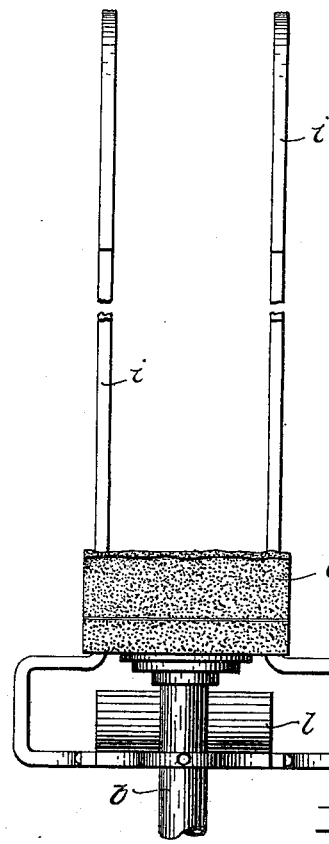

United States Patent Office.

HARRY M. REEVES, OF CHICAGO, ILLINOIS, ASSIGNOR TO STROMBERG-CARLSON TELEPHONE MANUFACTURING COMPANY, OF SAME PLACE.

FURNACE FOR HEATING METAL.

SPECIFICATION forming part of Letters Patent No. 683,983, dated October 8, 1901.

Application filed October 29, 1900. Serial No. 34,787. (No model.)

*To all whom it may concern:*

Be it known that I, HARRY M. REEVES, a citizen of the United States, residing at Chicago, in the county of Cook and State of Illinois, have invented a certain new and useful Improvement in Furnaces for Heating Metal, (Case No. 1,) of which the following is a full, clear, concise, and exact description, reference being had to the accompanying drawings, forming a part of this specification.

My invention relates to furnaces for heating metal, and has for its object the provision of an improved machine for heating metal preparatory to working the same.

Generally speaking, my invention comprises a conveyer for carrying the metal and a heater past which the metal is conveyed. The machine of my invention is particularly adapted for heating bars of steel that are to be formed into permanent magnets, and for this purpose the heating means is preferably arranged to heat the central portion of each steel bar, so that the heated bar may be then readily bent into the form of a horseshoe to produce a horseshoe-magnet. To secure effective heating, I preferably pass the steel bars between two walls of fire-brick, the heating-flames being preferably directed upon the steel bars from opposite sides, the heat being partially confined between the walls of fire-brick to secure more effective results and to prevent a waste of the heat. The conveyer is preferably in the form of a metallic belt or sprocket-chain that is vertically arranged, the chain being provided with a series of projections or rests that serve to support the steel bars that are placed upon the vertical stretch of the chain that passes between the burners, that are preferably vertically arranged, as are also the walls of firebrick.

Suitable guiding or retaining means are provided for preventing the steel bars from falling from the chain, a suitable take-off guide being provided beneath the burners that receive the heated metal.

I will explain my invention more fully by reference to the accompanying drawings, in which—

Figure 1 is a side elevation of a machine constructed in accordance with my invention. Fig. 2 is an elevation taken in the direction of the arrow 2 in Fig. 1. Fig. 3 is an elevation in detail of the guide and the means for supporting the same, taken in the direction of the arrow 3 in Fig. 1. Fig. 4 is a plan view of the apparatus of my invention.

Like parts are indicated by similar characters of reference throughout the different figures.

Two rows of fire-brick $a\ a$ are mounted upon pedestals $b\ b$. The rows or walls of firebrick are provided with apertures $c\ c$, through which the nozzles $d\ d$, that are preferably employed to convey fluid fuel, project. The drawings illustrate two opposed sets of nozzles. The conveyer is preferably in the form of duplicated sprocket-chains $e\ e$, that pass over the sprocket-wheels $f\ g$, the wheels $f$ being placed vertically above the wheels $g$, so that the stretches of the conveying-chain between the wheels $f$ and $g$ are disposed vertically. As viewed in Fig. 1, the vertical stretches of the chain $e$ upon the left are located in a plane between the vertical rows of fire-brick. Each chain is provided with lugs $h\ h$, the lugs upon one chain being located in horizontal alinement with the lugs upon its companion chain. A guide $i$ is opposed to the lugs upon the chains as they present themselves to the guide, a sufficient space intervening between the guide and the left-hand stretches of the chains to receive the bars of metal $k\ k$, the guide serving to prevent the dislodgment of the said metal bars from their engagement with the lugs upon the chains. The burners $d\ d$ are preferably centrally located in vertical alinement between the chains, so that the middle portions of the bars are subjected to the greatest heat, which enables the operator to more readily manipulate the heated metal. The metal bars $k$ are preferably lodged upon lugs as they near the upper end of the guide $i$. The bars are gradually heated as they pass the successive burners and are discharged upon a shelf $l$, the guide being enlarged or distended outwardly to permit the metal bars to fall upon the said shelf.

The guide, as illustrated, is preferably formed with two vertical arms, one located near each chain, so that the metal bars may be firmly held in place between the chains and the guide.

The fuel supplied to the burners may be of any suitable nature. I have illustrated a gas-pipe $m$, that has connection with the burners and supplies gas thereto. An air-pipe $n$ is also illustrated for conveying air under pressure to the same nozzles, a mixture of the gas and air occurring at the nozzles to produce combustion similar to that secured by a Bunsen burner.

Any suitable means may be employed for driving the conveyer-chains. I have illustrated a power-pulley $o$ employed for this purpose, that is geared upon the same shafts that support the gears $g$.

What I claim is—

1. The combination with two conveyers provided with lugs for engaging metal bars, of two rows of oppositely-located heating means located between the said conveyers, the said conveyers lying in a plane between the heating means, whereby the said heating means are adapted to act against opposite sides of said bars serving to heat the intermediate portions of the bars of metal carried by the conveyers, substantially as described.

2. The combination with two conveyers arranged to have their stretches upright or vertical, the said conveyers being provided with lugs for engaging metal bars, of heating means located between the said conveyers, serving to heat the intermediate portions of the bars of metal carried by the conveyers, and guiding means arranged parallel with said conveyers to prevent the metal bars from becoming dislodged from the conveyers as they pass before the heating means, substantially as described.

3. The combination with two conveyers arranged to have their stretches upright or vertical, the said conveyers being provided with lugs for engaging metal bars, of heating means located between the said conveyers, serving to heat the intermediate portions of the bars of metal carried by the conveyers, guiding means arranged parallel with said conveyers to prevent the metal bars from becoming dislodged from the conveyers as they pass before the heating means, and means for automatically effecting the discharge of the heated metal, substantially as described.

4. The combination with two conveyers arranged to have their stretches upright or vertical, said stretches being provided with lugs for engaging the articles to be carried, of vertical guiding means associated with the said conveyers to prevent the dislodgment of the articles carried by the conveyers the said guiding means being arranged parallel with in front of and adjacent to the upright stretches of the said conveyers to prevent articles from falling away from the vertically-disposed conveyers, substantially as described.

5. The combination with two conveyers arranged to have their stretches upright or vertical, said stretches being provided with lugs for engaging metal bars, of vertical guiding means for preventing the dislodgment of said metal bars, said guiding means being arranged parallel with in front of and adjacent to said conveyers for preventing articles from falling away from the vertically-disposed conveyers, and heating means for heating said bars, substantially as described.

6. The combination with two pairs of sprocket-wheels $f$ and $g$, one pair being located substantially vertically above the other, of conveying sprocket-chain $e$ passing over the sprocket-wheels, means for effecting the rotation of one pair of sprocket-wheels to thereby effect the travel of the conveying-chains, the said sprocket-chains being provided with horizontally-alined lugs for carrying metal bars, and centrally-disposed heating means for heating the intermediate portion of the metal bars, said heating means being in a position to act upon opposite sides of said metal bars, substantially as described.

7. The combination with two pairs of sprocket-wheels $f$ and $g$, one pair being located vertically above the other, of sprocket-chains $e$ passing over the sprocket-wheels, means for effecting the rotation of one pair of sprocket-wheels to thereby effect the travel of the conveying-chains, the said sprocket-chains being provided with horizontally-alined lugs for carrying metal bars, centrally-disposed heating means for heating the intermediate portion of the metal bars, and vertical guiding means arranged parallel with in front of and adjacent to the said conveying-chains to retain the said bars upon the said lugs of the vertical conveyers as the bars pass before the heating means, substantially as described.

8. In a machine of the class described, the combination with conveying means adapted to support the extremities of bars to be heated, of sprocket-wheels adapted to drive said conveying means, and heating means located centrally of said conveying means, adapted to heat the central and unsupported portions of said bars, substantially as described.

9. In a machine of the class described, the combination with conveying means for supporting the extremities of bars to be heated, of sprocket-wheels adapted to drive said conveying means, and rows of heating means located centrally of said conveying means, said heating means being so disposed as to act upon opposite sides of said bars to be heated, which heating means are adapted to heat the central and unsupported portions of said bars, substantially as described.

10. In a machine of the class described, the combination with conveying means adapted to support the extremities of bars to be heated, of sprocket-wheels adapted to drive said conveying means, rows of heating means located centrally of said conveying means and adapted to heat the central and unsupported portions of said bars, said rows being so disposed as to act upon opposite sides of said bars, and guides $i$ arranged parallel to said conveying means, substantially as described.

11. In a machine of the class described, the combination with conveying means adapted to support the extremities of bars to be heated, of sprocket-wheels adapted to drive said conveying means, rows of heating means arranged centrally of said conveying means, adapted to heat the central and unsupported portions of said bars, said rows of heating means being placed to act upon opposite sides of said bars, refractory walls $a\ a$ between which said bars are passed when heated, the said refractory walls being located in planes substantially parallel with the plane in which the conveying means is located, the said conveying means being located between the said refractory walls, and guides $i$ arranged parallel to said conveying means, substantially as described.

12. In an apparatus of the class described, the combination with a plurality of conveyers $e$, vertically-arranged sprocket-wheels for supporting said conveyers, lugs in horizontal alinement mounted upon said conveyers, said lugs being adapted to support the extremities of bars to be heated, and a plurality of burners for heating the central and unsupported portions of said bars, said rows of burners being placed in such manner as to act upon opposite sides of said bars, substantially as described.

13. In an apparatus of the class described, the combination of a plurality of conveyers $e$, vertically-arranged sprocket-wheels for supporting said conveyers, lugs in horizontal alinement mounted upon said conveyers, said lugs being adapted to support the extremities of bars to be heated, a plurality of burners for heating the central and unsupported portions of said bars, said burners being disposed so as to act against opposite sides of said bars, and refractory walls $a\ a$ through which said burners project, substantially as described.

In witness whereof I hereunto subscribe my name this 13th day of October, A. D. 1900.

HARRY M. REEVES.

Witnesses:
F. E. JOHNSON,
C. E. HUBERT.